United States Patent [19]

Saele et al.

[11] 4,028,914

[45] June 14, 1977

[54] LOCKABLE CONTAINER SPOUT CLOSURE

[75] Inventors: Arvid Harlan Saele; Michael Pier Hutton, both of Dubuque, Iowa

[73] Assignee: Deere & Company, Moline, Ill.

[22] Filed: June 14, 1976

[21] Appl. No.: 695,637

[52] U.S. Cl. .................................. 70/165; 220/210
[51] Int. Cl.² .................. B65D 41/04; B67D 5/32; E05B 65/52
[58] Field of Search ............ 70/158, 163, 164, 165, 70/166, 168, 169; 220/210; 222/153

[56] References Cited

UNITED STATES PATENTS

| | | | |
|---|---|---|---|
| 1,173,812 | 2/1916 | Korn | 70/165 |
| 2,138,871 | 12/1938 | Mallvk | 70/165 |
| 3,537,283 | 11/1970 | Mross | 70/164 |

FOREIGN PATENTS OR APPLICATIONS

| | | | |
|---|---|---|---|
| 113,468 | 3/1969 | Denmark | 292/65 |
| 819,748 | 9/1959 | United Kingdom | 220/210 |

*Primary Examiner*—J. Franklin Foss

[57] ABSTRACT

A lockable container spout closure includes a dished, externally threaded main cap adapted for threaded insertion into an internally threaded spout. A secondary cap covers the main cap and is rotatably secured thereto. A key-operable lock is mounted in the secondary cap and includes a fixed cylinder disposed in a cavity defined by the main and secondary caps. A key-rotatable barrel is located centrally in the cylinder and has a cam fixed to an end thereof and operable in response to rotation of the barrel between lock and unlock positions to shift a lock member between a first position wherein it will clear a stop projecting from the main cap upon rotation of the secondary cap, and a second position wherein it will engage the stop to thereby effect rotation of the main cap upon rotation of the secondary cap.

4 Claims, 4 Drawing Figures

LOCKABLE CONTAINER SPOUT CLOSURE

BACKGROUND OF THE INVENTION

The present invention relates to lockable container spout closures of a type including inner and outer rotatably interconnected caps and a lock mechanism for selectively effecting a lock condition, wherein the outer cap is rotatable exclusive of the inner cap, and an unlock condition wherein the inner cap is driven by rotation of the outer cap.

Lockable closures of the aforementioned type are known however they suffer one more of the disadvantages of requiring a padlock, which must be stored when the closure is removed, of being difficult to service, of having parts arranged such that their failure may result in parts thereof falling into the container and of being relatively complex.

SUMMARY OF THE INVENTION

According to the present invention, there is provided a novel lockable closure for a container spout.

Broadly described, the closure of the present invention includes an outer or secondary cap covering and rotatably connected to an inner or main cap provided with external threads and adapted for threaded insertion into an internally threaded spout. The inner and outer caps cooperate to define a cavity and a key-operable lock is mounted on the outer cap and includes a cylinder located in the cavity. A key-rotatable barrel is disposed centrally in the cylinder and has an exposed end, in the cavity, which carries a cam that operably engages a lock element. A stop member is fixed to the inner cap and upon rotation of the barrel between lock and unlock positions the lock element is moved between a first position, wherein it is free of the stop so as to permit the outer cap to be rotated free of the inner cap, and a second position wherein the lock element disposed for engagement with the stop and serves to cause the inner cap to be rotated together with the outer cap.

An object of the invention is to provide a lockable closure of simple design embodying a lock mechanism which remains therewith when the closure is removed from a container spout.

Another object is to provide a closure which is easy to repair in the event that a part thereof fails.

An object, related to the immediately preceding object, is to provide a closure designed such that failed parts will not fall into the container closed by the closure.

These and other objects will become apparent from a reading of the ensuing description together with the appended drawings.

DESCRIPTION OF THE PREFERRED EMBODIMENT

Figure 1:
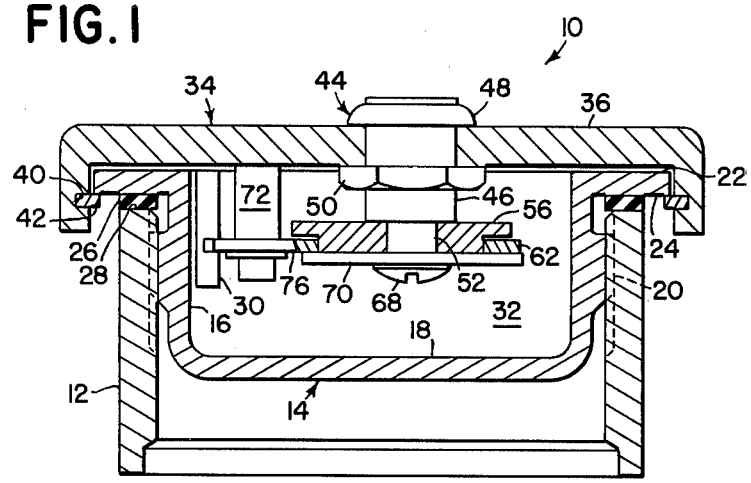
FIG. 1 is a sectional view of the closure of the present invention.

Referring now to FIG. 1, therein is shown a closure 10 threadedly received in an internally threaded open end portion of a container spout 12. Specifically, as viewed in FIG. 1, the closure 10 includes a dished inner or main cap 14 including a circular upright wall 16 forming a continuation of a substantially flat bottom wall 18 and being externally threaded at 20. Provided at the top of the wall 16 is an annular flange 22 extending radially above and outwardly beyond the threads 20. The flange 22 includes a flat seating surface 24 facing axially in the direction of the threads 20 and sealingly engaged with a circular gasket 26 in sealing engagement with an open end 28 of the container spout 12. For a purpose to be explained below, a stop member 30 is fixed to the interior wall 16.

Covering the inner cap 14 and cooperating therewith to define a cavity 32 is an outer or secondary cap 34 having a generally horizontal top wall 36 extending above and a flange 38 extending in axial surrounding relationship to the flange 22. An annular groove 40 is provided in the flange 38 and received in the groove 40 is a snap ring 42 which extends beneath the flange 22 for engagement with the surface 24 to prevent the outer cap 34 from being separated from the inner cap 14 while establishing a connection permitting the cap 34 to be rotatable relative to the inner cap 14.

Figure 2:
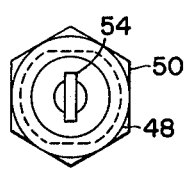
FIG. 2 is a top plan view of the lock of the closure of FIG. 1.
Figure 3:
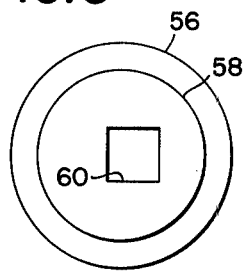
FIG. 3 is a bottom view of the lock-operated cam, as shown in FIG. 1.
Figure 4:
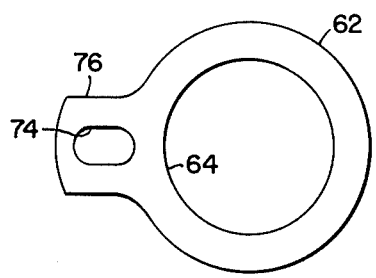
FIG. 4 is a top plan view of the locking element, as shown in FIG. 1.

A lock mechanism is provided for selectively establishing or disconnecting a driving connection between the outer and inner caps 34 and 14. Specifically, the lock mechanism comprises a key-operable lock 44 including a cylinder 46 inserted through a hole provided in the top wall 36 and including an enlarged end 48 engaged with an upper surface of the wall 36. A nut 50 is threaded on the cylinder 46 and is engaged with an undersurface of the wall 36. Disposed centrally in the cylinder 32 is a key-rotatable barrel 52 provided with a key slot 54 (FIG. 2) into which a key may be inserted to disengage one or more tumblers (not shown) from the cylinder 46 so as to permit rotation of the barrel 52, relative to the cylinder 46, between lock and unlock positions, as hereinafter described. The barrel 52 extends from the lower end of the cylinder 46 into the cavity 32 and includes an exposed portion immediately below the cylinder 46 which is substantially square in transverse cross-section. A cam 56 having a circular cam surface 58 (FIG. 3) is provided with a square hole 60 in which is received the exposed barrel portion, the hole 50 being centered eccentrically relative to the cam surface 58. A lock member or slider 62 is provided with a circular opening 64 receiving the cam surface 58. The cam 56 and lock member 62 are held in place by a screw 68 received in the bottom of the barrel and holding a washer 70, which extends beneath the member 62, in tight engagement with the bottom of the cam 56. For the purpose of preventing the lock member 62 from rotating about the cam surface 58 and for guiding the member 62 in a straight path in response to rotation of the barrel 52, a guide projection 72 is fixed to the outer cap 34 and extends into a slot 74 provided in a necked extension 76 of the member 62. The slot 74 is aligned with the respective centers of the cam surface 58 and square hole 60 when the lock 44 is in either an unlock position, wherein the center of the cam surface 58 is located between the slot 62 and center of the hole 50, as shown in FIG. 1, or a lock position wherein the center of the cam surface is rotated away from its FIG. 1 position.

It will be appreciated then that due to the eccentric location of the hole 60 relative to the center of the cam surface 58, rotation of the barrel 52 between its unlock and lock positions will cause the lock member 62 to move between a position, wherein the extension 76 thereof is located adjacent the wall 16 in a position for engaging the stop member 30 to cause rotation of the cap 14 when the cap 34 is rotated, and a position wherein the extension is retracted away from the wall 16 a distance sufficient for the extension 76 to move past the stop member 30 when the cap 34 is rotated.

The operation of the closure 10 is thought to be apparent from the foregoing description and for the sake of brevity no further description of the operation is given.

We claim:

1. In a lockable closure for a container spout including a dished inner cap defined by an upright cylindrical side wall and a bottom wall and having a central axis about which it is adapted for rotation to and from closing relationship relative to an open container spout end, an outer cap completely covering said inner cap and cooperating therewith to define a cavity, connecting means securing the outer cap to the inner cap for preventing separation of one from the other but permitting relative rotation therebetween about the central axis, a key-operable lock mounted in the outer cap and including a cylinder projecting into the cavity and having a key-operable barrel located therein and projecting therethrough into the cavity, a stop means formed integrally with the upright cylindrical side wall of the inner cap and located in said cavity, a lock member, means operatively connecting the lock member to the barrel for radial reciprocation, in response to selected rotation of the barrel, between a lock position wherein it rotates clear of the stop means when the outer cap is rotated and an unlock position wherein it engages its stop means and causes the inner cap to be rotated with the outer cap when the latter is rotated, the improvement comprising: a guide member fixed to the outer cap and projecting into the cavity at a distance from the central axis which is less than the distance the stop means is from the central axis; and said lock member having an elongated guide slot therein and positioned with said guide member located in said guide slot, whereby when the lock member is in its unlock position, the guide member will serve to transmit rotation of the outer cap to the inner cap by way of the locking member.

2. The closure defined in claim 1 wherein the inner cap includes an annular flange extending radially relative to said axis and defining a downwardly facing sealing surface means for sealing engagement with an open end of a spout.

3. The closure defined in claim 2 wherein said outer cap includes an annular flange extending axially relative to said axis just radially outwardly of the annular flange of said inner cap; said annular flange of the outer cap being provided with an internal groove; and said connecting means securing the inner and outer caps together being an internal snap ring seated in said groove and engaging a radially outer portion of said sealing surface means.

4. The closure defined in claim 1 wherein said actuating means connecting the locking member to the barrel includes a substantially circular cam eccentrically fixed to the barrel for rotation therewith and including a circular cam surface; and said locking member including a substantially circular opening rotatably receiving said cam surface for sliding engagement therewith when the barrel is rotated.

* * * * *